US009661599B2

(12) United States Patent
Thomson

(10) Patent No.: US 9,661,599 B2
(45) Date of Patent: May 23, 2017

(54) DIGITALLY SIGNING ACCESS POINT MEASUREMENTS FOR ROBUST LOCATION DETERMINATION

(75) Inventor: Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1115 days.

(21) Appl. No.: 12/244,980

(22) Filed: Oct. 3, 2008

(65) Prior Publication Data

US 2009/0046633 A1 Feb. 19, 2009

Related U.S. Application Data

(63) Continuation-in-part of application No. 11/537,805, filed on Oct. 2, 2006, now Pat. No. 7,564,795.

(51) Int. Cl.
*H04W 64/00* (2009.01)
*H04W 12/06* (2009.01)
*H04L 29/06* (2006.01)

(52) U.S. Cl.
CPC ......... *H04W 64/00* (2013.01); *H04L 63/0823* (2013.01); *H04W 12/06* (2013.01)

(58) Field of Classification Search
CPC ....... H04W 64/00; H04W 4/02; H04W 12/06; H04W 64/006; G01S 5/0252; G01S 5/02; G01S 5/10; G01S 5/14; G01S 5/009; G01S 5/0289; G01S 5/0221
USPC ....... 370/338; 380/270, 277; 455/115.3, 411, 455/456.1–457
See application file for complete search history.

(56) References Cited

U.S. PATENT DOCUMENTS

| | | | |
|---|---|---|---|
| 5,539,803 A | 7/1996 | Bhat et al. | |
| 6,425,132 B1 | 7/2002 | Chappell et al. | |
| 6,801,778 B2 | 10/2004 | Koorapaty et al. | |
| 7,013,138 B2 | 3/2006 | Mahany et al. | |
| 7,085,697 B1 | 8/2006 | Rappaport et al. | |
| 7,154,436 B1 | 12/2006 | Chadha et al. | |
| 7,320,070 B2 | 1/2008 | Baum et al. | |
| 7,574,736 B2 * | 8/2009 | Salapaka et al. | 726/13 |
| 2002/0098870 A1 | 7/2002 | Kashiwagi et al. | |
| 2003/0014755 A1 * | 1/2003 | Williams | H04H 20/106 725/62 |
| 2003/0036391 A1 | 2/2003 | Jordan et al. | |
| 2003/0046238 A1 * | 3/2003 | Nonaka | G06F 21/10 705/51 |
| 2003/0058808 A1 | 3/2003 | Eaton et al. | |

(Continued)

FOREIGN PATENT DOCUMENTS

WO 2005057834 6/2005

OTHER PUBLICATIONS

International Search Report for Application No. PCT/US07/80033 dated Aug. 19, 2008.

(Continued)

*Primary Examiner* — Allahyar Kasraian
(74) *Attorney, Agent, or Firm* — Patterson + Sheridan LLP

(57) ABSTRACT

In an example embodiment, a wireless client sends a probe request frame and waits for responses to the probe frame. The responses to the probe request from comprise encrypted data representative of the signal strength of the client as measured by the respondent that are digitally signed by the respondent's certificate. The client aggregates the responses and forwards them to a location based server.

14 Claims, 2 Drawing Sheets

(56) References Cited

U.S. PATENT DOCUMENTS

| | | |
|---|---|---|
| 2003/0220982 A1 | 11/2003 | Tran et al. |
| 2004/0077367 A1* | 4/2004 | Sama et al. ............... 455/518 |
| 2004/0125401 A1 | 7/2004 | Earl et al. |
| 2004/0147232 A1 | 7/2004 | Zodnik et al. |
| 2004/0147269 A1 | 7/2004 | Kim |
| 2004/0196810 A1 | 10/2004 | Kil et al. |
| 2004/0203600 A1* | 10/2004 | McCorkle ............... G01S 7/023 455/411 |
| 2005/0004746 A1 | 1/2005 | Morita et al. |
| 2005/0136845 A1* | 6/2005 | Masuoka ............... G01S 5/0294 455/67.14 |
| 2005/0136972 A1 | 6/2005 | Smith et al. |
| 2005/0174236 A1 | 8/2005 | Brookner et al. |
| 2005/0197136 A1* | 9/2005 | Friday et al. ............. 455/456.1 |
| 2005/0245127 A1 | 11/2005 | Nordin et al. |
| 2005/0282523 A1* | 12/2005 | Yoshihara ........... H04L 12/2854 455/411 |
| 2006/0014546 A1 | 1/2006 | Bodin et al. |
| 2006/0063540 A1 | 3/2006 | Beuck |
| 2006/0267841 A1* | 11/2006 | Lee ....................... G01S 5/0081 342/463 |
| 2007/0197262 A1 | 8/2007 | Smith et al. |
| 2007/0224993 A1* | 9/2007 | Forsberg ............... H04L 9/0844 455/436 |
| 2007/0263818 A1 | 11/2007 | Sumioka et al. |
| 2008/0032706 A1* | 2/2008 | Sheynblat ............ G01S 5/0036 455/456.1 |
| 2008/0132170 A1* | 6/2008 | Alizadeh-Shabdiz et al. ............................ 455/41.2 |
| 2008/0200181 A1* | 8/2008 | Zill ........................ G01S 5/02 455/456.1 |
| 2008/0214213 A1* | 9/2008 | Etemad ................ H04W 12/02 455/456.6 |

OTHER PUBLICATIONS

Written Opinion of the International Searching Authority for Application No. PCT/US07/80033.
Extended European Search Report for PCT/US2007/080033 dated Nov. 21, 2013, 6 pages.

* cited by examiner

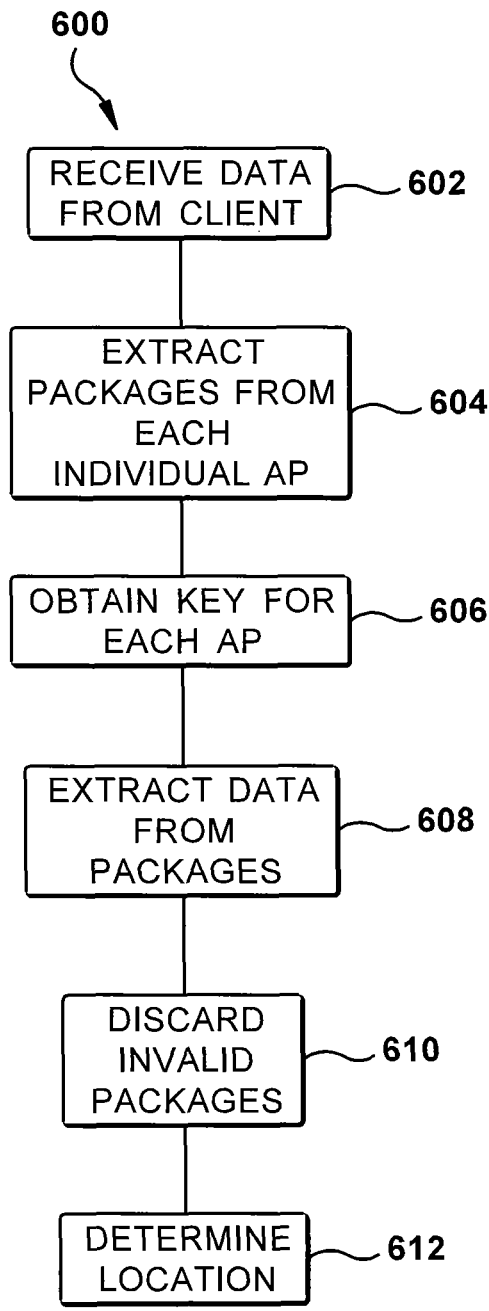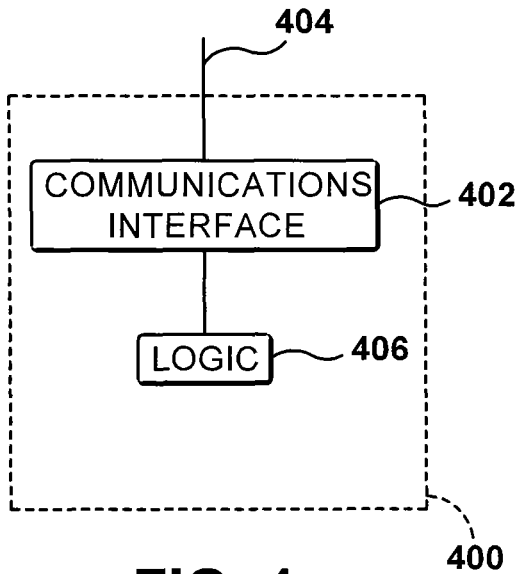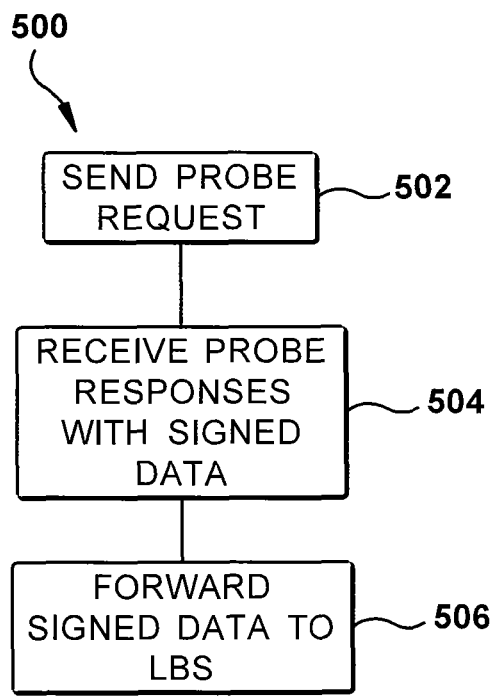
FIG. 6
FIG. 4
FIG. 5

US 9,661,599 B2

DIGITALLY SIGNING ACCESS POINT MEASUREMENTS FOR ROBUST LOCATION DETERMINATION

CROSS REFERENCE TO RELATED APPLICATIONS

This application is a continuation in part of U.S. application Ser. No. 11/537,805 filed on Oct. 2, 2006 now U.S. Pat. No. 7,564,795.

TECHNICAL FIELD

The present disclosure relates generally to determining the location of wireless devices.

BACKGROUND

Today there are many companies that are providing client-based location tracking solution where the client itself determines location. In one example, a company drives around the globe mapping locations of all Access Points (APs) they can scan or see. This information including the exact location of the APs is stored on a server and when a client running their client software connects to the server, the client reports the APs that it sees to the server and their signal strengths. The server calculates the location of the client based on the client's reported AP measurement information. This use case is becoming particularly important in home networking, transportation industry, etc. By having the client report information to the server, the server itself does not have to talk directly to each AP which is not possible in most cases.

BRIEF DESCRIPTION OF THE DRAWINGS

The accompanying drawings incorporated herein and forming a part of the specification illustrate the examples embodiments.

FIG. 4 is an example of a location based server upon which an example embodiment can be implemented.

FIG. 5 is an example of a methodology for a client to provide signal strength data in accordance with an example embodiment.

FIG. 6 is an example of a methodology for a location based server to determine the location of a wireless client in accordance with an example embodiment.

OVERVIEW OF EXAMPLE EMBODIMENTS

Figure 1:
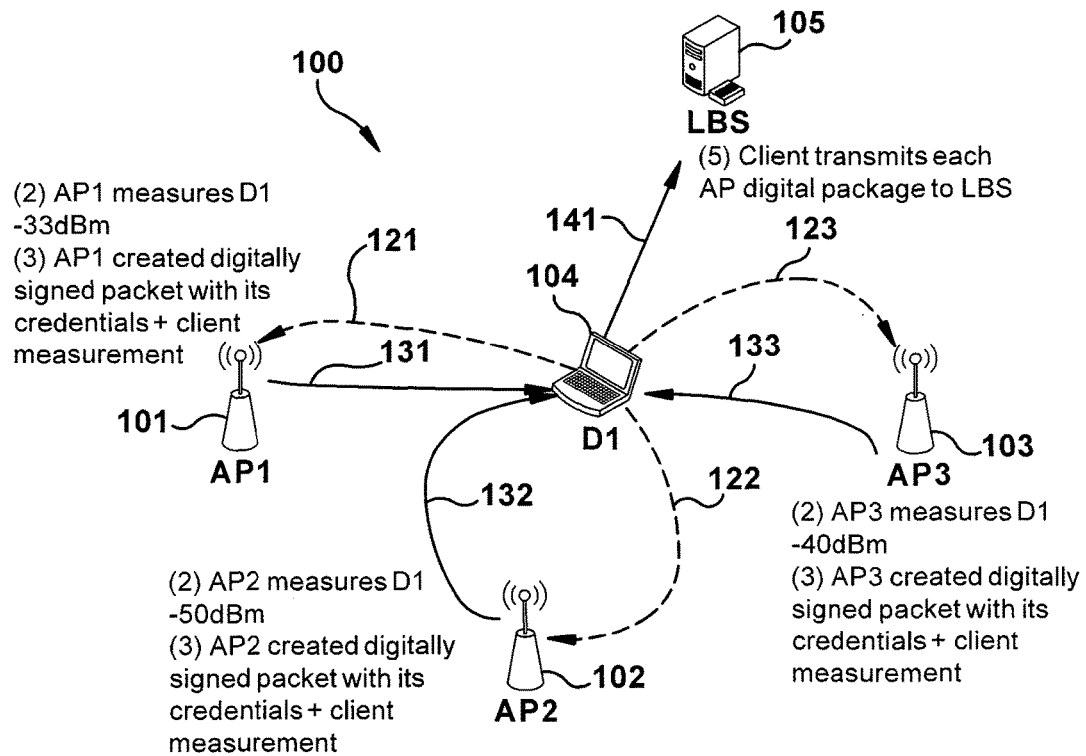
FIG. 1 is an example of a network configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a system wherein a device, such as a wireless client sends a probe frame. Each access point (AP) that receives the probe frame sends a probe response frame. The probe Response frame contains measured data of the probe request, such as signal strength, angle of arrival (AOA) or time difference of arrival (TDOA) as measured by the AP encrypted with a certificate of each responder. The wireless client aggregates the probe responses and sends the signed data provided in the probe response, in its encrypted form, unchanged, to a location based server. The location based server is configured to validate each AP's certificate. The server may acquire the certificate for an AP or use a common root certificate. The server validates the response frames and acquires the signal strength data. The location based server is then able to ascertain the current location of the wireless client based on the signal strength data. Moreover, because the Location based server (LBS) can validate that the measured signal strength information has not been tampered with or modified, the LBS can use the information to reliably determine location.

In accordance with an example embodiment, there is described herein an apparatus, comprising a wireless transceiver and logic coupled to the wireless transceiver. The logic is configured to send a frame to acquire data for determining location such as signal strength data or other measurements via the wireless transceiver. The logic is configured to receive at least one response frame from at least one respondent via the wireless transceiver, wherein the at least one response frame comprises signal strength data digitally signed with a certificate for the respondent. The logic is configured to send the at least one response frame with the signal strength data digitally signed with the certificate for the respondent to a location server via the wireless transceiver.

In accordance with an example embodiment, there is disclosed herein an apparatus, comprising a wireless transceiver, and logic coupled to the wireless transceiver. The logic is configured to receive a frame from a client to acquire location data for determining location of the client via the wireless transceiver. The logic is configured to acquire a measurement the signal strength of the received frame. The logic is configured to generate a response frame; the response frame comprises signal strength data digitally signed with a certificate. The logic is configured to send the response frame to the client via the wireless transceiver.

In accordance with an example embodiment, there is disclosed herein an apparatus comprising a communications interface, and logic coupled to the communications interface configured to receive data from the communications interface. The logic is configured to receive data from a wireless client comprising signal strength data from a plurality of wireless devices providing signal strength data via the communications interface. The logic is configured to validate each of the plurality of wireless devices providing signal strength data. The logic is further configured to validate signal strength data for each of the plurality of wireless devices providing signal strength data. The logic determines the location of the client based on the validated signal strength data for each of the plurality of wireless devices providing signal strength data.

In accordance with an example embodiment, there is disclosed herein a method, comprising sending a probe request frame and receiving a plurality of probe response frames, each comprising an information element comprising data representative of signal strength as measured by a respondent encrypted with a key for the respondent. The plurality of probe response frames are aggregated and forwarded to a location based server. The information element for each respondent is forwarded to the location based server unchanged.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The accompanying drawings incorporated herein and forming a part of the specification illustrate the examples embodiments.

FIG. 1 is an example of a network 100 configured in accordance with an example embodiment. In network 100, each access point (AP) 101, 102, 103 is configured with a certificate that has a public and private key pair that the customer cannot change. For example, each AP 101, 102, 103 can be configured with one or more certificates, that are based on a manufacturer's root certificate and are unique to the Media Access Control (MAC) address for each AP.

Location based server (LBS) 105 is configured with one or more root certificates for any AP, such as APs 101, 102, 103 that will be providing location based information. In an example embodiment, LBS 105 is able to ascertain the certificate for each AP 101, 102, 103 based on the root certificate and the MAC address of the AP.

In operation, a client, for example a wireless mobile device, 105 a client will transmit a packet, such as a probe request, which is received by APs 101, 102, 103 as indicated by 121, 123, 123 respectively. Although in the examples provided herein employ probe requests/probe response packets, those skilled in the art should readily appreciate that any predefined packet type can be employed for acquiring location based data. For example, a special predefined packet may be employed.

Each AP 101, 102, 103 that measures the probe request from the client will measure the signal strength of the signal received from the client. For example, the signal measured by AP 101 may be −33 dBm, by AP 102 −50 dBm, and by AP 103 −40 dBm. Each AP 101, 102, 103 creates a package using its private key that includes the measured signal strength. In particular embodiments, the package may include one or more of an unencrypted version of its certificate
and the following information encrypted:
the AP MAC address
the MAC address of the client; and
a UTC timestamp of the time of measurement.

Each AP 101, 102, 103 includes the package in responses 131, 132, 131 respectively sent to client 104. For example, the package may be included in an information element included in a probe response frame sent to client 104.

Upon receipt of the probe response 131, 132, and/or 133 by client 104, client 104 forwards the AP package information to LBS server 105. In an example embodiment, client 104 aggregates responses from each AP that responded with a digitally signed package into a single LBS message 141.

Upon receipt of the signed AP packages from client 104, LBS 105 goes through each individual AP package, extracts the AP's public key (e.g. certificate) and validates the package by making sure the package is signed correctly using the public key of the AP. Once the content has been unwrapped and any illegal content discarded, the LBS 105 calculates location of the client based on the AP measurements and knowing the location of each AP 101, 102, 103. LBS 105 may store the data, or optionally, may provide the data to wireless client 104 or a predefined application.

A benefit of the embodiment illustrated in FIG. 1 is that the digital certificate can be employed to ensure reliable signal strength data is derived from data received from known and trusted APs. This mitigates the fear of data being modified by the client, while not requiring that each AP is connected directly to the LBS. In an example embodiment data from APs that do not provide a valid certificate can be discarded, this would prevent data from erroneous results due to rogue APs.

Figure 2:
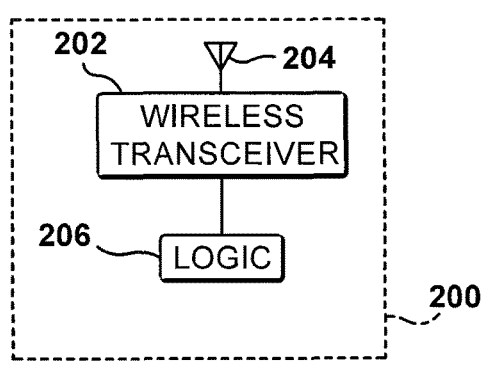
FIG. 2 is an example of a wireless client upon which an example embodiment can be implemented.

FIG. 2 is an example of a wireless client 200 upon which an example embodiment can be implemented. Wireless client 200 is suitable for providing the functionality described for client 104 in FIG. 1.

Wireless client comprises a wireless transceiver 202. As used herein, a wireless transceiver is any transceiver of receiving wireless signals, including but not limited to radio frequency (RF), optical, and/or infra red (IR) signals. An antenna 204 may be employed for aiding wireless transceiver 202 in sending and receiving wireless signals. Logic 206 is coupled to wireless transceiver 202, enabling logic 206 to receive data from wireless signals received by wireless transceiver 202 and to send data wirelessly via wireless transceiver 202.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Logic may be encoded in a tangible, or computer readable, medium. The term "computer-readable medium" as used herein refers to any medium that participates in providing instructions to a processor for execution. Such a medium may take many forms, including but not limited to non-volatile media, volatile media, and transmission media. Non-volatile media include for example optical or magnetic disks, or a storage device. Volatile media include dynamic memory such as Random Access Memory (RAM). Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, logic 206 is configured to send a frame to acquire location data via wireless transceiver 202. The frame may be a probe request frame or any other predefined frame that enables the acquisition of location based data. Logic 206 is configured to receive at least one response frame from at least one respondent (for example APs such as APs 101, 102, 103 as illustrated in FIG. 1) via the wireless transceiver 202. The response frame(s) suitably comprise signal strength data digitally signed with a certificate for the respondent. For example, the response frames may be probe response frames. The probe response frame may suitably comprise an information element with the encrypted (digitally signed) signal strength data. In particular embodiments, logic 106 receives a plurality of response frames. In an example embodiment, logic 106 aggregates the responses. Logic 206 is further configured to send the at least one response frame with the signal strength data digitally signed with the certificate for the respondent to a location server (not shown—see e.g. LBS 105 in FIG. 1) via wireless transceiver 202.

In an example embodiment, the certificate used to sign the signal strength data comprises public key and private key pair. The certificate may be based on a root certificate and is unique to the Media Access Control address of the responder. For example if the AP is manufactured by Cisco Systems, Inc, 710 West Tasman Drive, San Jose, Calif. 95134, the certificate may be based off a root certificate to Cisco Systems, Inc. that is unique to the MAC address of the AP.

In an example embodiment, the response frame further comprises data representative of an unencrypted version of certificate for the respondent (e.g. the certificate for an AP sending the probe response in response to the probe request). The signal strength data may further comprises the MAC address of the responder. In particular embodiments, the signal strength data further comprises a MAC address associated with wireless transceiver 202 (the client's MAC address) and a timestamp.

Figure 3:
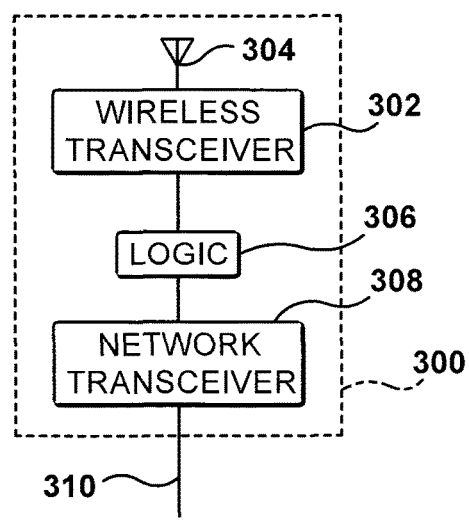
FIG. 3 is an example of a wireless access point upon which an example embodiment can be implemented.

FIG. 3 is an example of a wireless access point (AP) 300 upon which an example embodiment can be implemented. AP 300 is suitable for implementing one of APs 101, 102, 103 (FIG. 1).

AP 300 comprises a wireless transceiver 302 suitable for sending and receiving wireless data. Wireless transceiver 302 may employ an antenna 304 for sending and receiving wireless signals. Logic 306 is coupled to wireless transceiver 302 and is operable to receive data from signals received by wireless transceiver 302 and have data sent to wirelessly by wireless transceiver 302. AP 300 may suitably comprise a network transceiver 308 for communicating with a distribution network (not shown). A coupler 310 may be employed for coupling network transceiver 308 to the distribution network. Network transceiver may suitably be configured to send/receive data via a wired interface and/or a wireless interface (e.g. connected to a Mesh Network backhaul).

Logic 306 is configured to receive a frame from a client to acquire signal strength data, for the client via the wireless transceiver 302. The frame may be a probe request or any other frame which signal strength data is defined for a response. Logic 306 is configured to acquire a measurement the signal strength of the received frame. Logic 306 is further configured to generate a response frame, for example a probe response frame, comprising signal strength data digitally signed with a certificate. Logic 306 sends the response frame to the client via the wireless transceiver 304.

In an example embodiment, the certificate comprises public key and private key pair. In particular embodiments, the public key private key pair is based on a root certificate and is unique to the MAC address associated with the wireless transceiver 302.

In an example embodiment, the response frame further comprises data representative of an unencrypted version of certificate for the respondent. The signal strength data digitally signed with the certificate further comprises the MAC address associated with wireless transceiver 302, a MAC address associated with the client and a timestamp.

FIG. 4 is an example of a location based server (LBS) 400 upon which an example embodiment can be implemented. LBS 400 is suitably adaptable to perform the operations of LBS 105 in FIG. 1.

LBS 400 comprises a communications interface 402 that is coupled via a coupler 404 to a network (not shown). Communication s interface 402 may be a wired or wireless interface. For example, communication interface 402 may be a wired interface (for example an Ethernet port) and coupler 404 a cable for connecting communications interface 402 to the network. In a wireless embodiment, coupler 404 can be an antenna.

Logic 406 is coupled to communications interface 402. Logic 406 is configured to receive data from communications interface 402. In an example embodiment, logic 406 is configured to receive data via the communications interface 402 from a wireless client. The signal strength data comprises signal strength data from a plurality of wireless devices providing signal strength data. Logic 406 is configured to acquire a digital certificate for each of the plurality of wireless devices providing signal strength data. Logic 406 is further configured to validate signal strength data for each of the plurality of wireless devices providing signal strength data. Logic 406 determines the location of the client based on the validated signal strength data for each of the plurality of wireless devices with known locations providing signal strength data. Digitally signed data ensures that the location data was not altered while in transit, ensuring the reliability of the signal strength data and the source of the signal strength data.

In an example embodiment, the digital certificate comprises public key and private key pair. In particular embodiments, the public key private key pair are based on a root certificate which is unique to the MAC address associated with each of the wireless transceivers providing signal strength data.

In an example embodiment, the signal strength data further comprises data representative of an unencrypted version of certificate for the respondent. In particular embodiments, the signal strength data further comprises the MAC address associated with a wireless device providing the signal strength data, a MAC address associated with the client and a timestamp.

In view of the foregoing structural and functional features described above, methodologies in accordance with example embodiments will be better appreciated with reference to FIGS. 5 and 6. While, for purposes of simplicity of explanation, the methodologies of FIGS. 5 and 6 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology. The methodologies described herein are suitably adapted to be implemented in hardware, software, or a combination thereof.

FIG. 5 is an example of a methodology 500 for a client to provide signal strength data in accordance with an example embodiment. The signal strength data can be employed by a location based server (LBS) for determining the location of the client.

At 502, the client sends a frame to acquire signal strength data. In an example embodiment a probe request frame is employed.

At 504, the client receives at least one response to the probe request frame. The responses include data representative of the client's signal strength as measured by the responder. In an example embodiment, the signal strength data is contained in an information element that is encrypted using a key for the respondent. The key may belong to a public key, private key pair. The certificate used to generate the key may be based on a root certificate for the manufacturer of the respondent (for example the manufacturer of an AP sending a probe response) that is unique to the MAC address of the AP. The response may include one or more of MAC address of the responder, MAC address of the client, a timestamp, and/or an unencrypted version of the certificate for the respondent. In an example embodiment, the client aggregates a plurality of probe response frames.

At 506, the at least one response is forwarded to a location based server. In an example embodiment, the digitally signed information element for each respondent is forwarded unchanged. This allows the location based server to verify the data was forwarded without being modified by the client and verify the identity of the respondent (e.g. AP) that provided the measurement. This enables the location based server to ascertain the client's location based on authenticated measurements that are provided by the client.

FIG. 6 is an example of a methodology 600 for a location based server to determine the location of a wireless client in accordance with an example embodiment. Methodology 600 determines the location of the wireless client based on data provided by the client that the location based server can authenticate to ensure the accuracy of the data, without having to receive the data from each device providing a measurement directly.

At 602, the data is received from the client. The client may send the data via the access point it is currently associated to an Internet Protocol (IP) address for the location based server.

At 604, the location based server extracts data packages that were sent to the client by each responder. For example, if a client sends a probe response, each AP receiving the probe response would respond with a digitally signed package suitably comprising data representative of the signal strength measured by the AP.

At 606, the location based server acquires a key for each AP that had a data package in the data sent from the client. The key may be based on a public key/private key pair or any suitable keying arrangement may be employed. For example, the key may be base on a root certificate and the MAC address of each AP, At 608, using the key for each AP, the data is acquired from each package. The package data suitably comprises data representative of measured signal strength of the probe request sent by the client as measured by the AP. In an example embodiment, the package data further comprises the MAC address of the AP providing the measurement, the MAC address of the client and/or a timestamp.

At 610, invalid data packages are discarded. For example a package may be discarded if after decrypting the package using a key for the AP purportedly sending the package the package contains invalid or inconsistent data. For example, packages may also be discarded if the timestamp is not within a predetermined range or is not consistent with timestamps from other data packages.

At 612, the location of the client is determined. For example, the location based server, using authenticated data sent by the client and the known physical location data of the respondents (APs) that sent a response to the client's probe response can determine the client's location based on the signal strength data. The server may store the data or in an example embodiment may provide the data to the client. In an example embodiment, the data is provided to an application. In particular embodiments, the application has an authenticated session established with the server.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transceiver;
logic coupled to the wireless transceiver;
wherein the logic is configured to send a signal comprising a probe request to acquire measurement data for determining a location of the apparatus via the wireless transceiver;
wherein the logic is configured to receive a plurality of probe response frames from a plurality of respondents via the wireless transceiver, each of the plurality of probe response frames comprising data representative of a measured signal strength of the signal as measured by the plurality of respondents, wherein each of the plurality of probe response frames is encrypted with a respective key for each of the plurality of respondents; and
wherein the logic is configured to aggregate the plurality of probe response frames and forward, using the wireless transceiver, the aggregated plurality of probe response frames to a server providing a location service, wherein the aggregated plurality of probe response frames remain encrypted with the respective key for each of the plurality of respondents when forwarded.

2. The apparatus of claim 1, wherein each of the plurality of probe response frames comprises a respective Media Access Control address of the plurality of the respondents.

3. The apparatus of claim 2, wherein each of the plurality of probe response frames comprises a Media Access Control address associated with the wireless transceiver and a timestamp.

4. The apparatus of claim 1, wherein the plurality of probe response frames comprise media access control (MAC) addresses of the plurality of respondents, a MAC address of the apparatus sending the probe request, and a timestamp encrypted by the plurality of respondents.

5. A method, comprising:
sending a signal comprising a probe request frame requesting measurement data for determining a location;
receiving a plurality of probe response frames from a plurality of respondents, each of the plurality of probe response frames comprising data representative of a measured signal strength of the signal as measured by the plurality of respondents, wherein each of the plurality of probe response frames is encrypted with a respective key for the each of the plurality of respondents;
aggregating the plurality of probe response frames; and
forwarding the plurality of probe response frames to a location based server, wherein the plurality of probe response frames remain encrypted with the respective key for each of the plurality of respondents when forwarded.

6. The method of claim 5, wherein each of the plurality of respondents is associated with a respective certificate, and each of the plurality of probe response frames further comprises data representative of an unencrypted version of the respective certificate associated with each of the plurality of respondents.

7. The method of claim 5, wherein each of the plurality of probe response frames further comprises a respective Media Access Control address associated with each of the plurality of respondents, a Media Access Control address associated with a sender of the probe request frame, and a timestamp.

8. The method of claim 5, wherein each of the plurality of respondents is associated with a respective certificate, and each of the plurality of probe response frames further comprises an unencrypted version of the respective certificate, a respective media access control (MAC) address of each of the plurality of respondents, a MAC address of a sender of the probe request frame, and a timestamp encrypted by the plurality of respondents.

9. Logic embodied on a non-transitory computer readable medium for execution by a processor, and when executed operable to:
    send a signal, the signal comprising a probe request frame requesting measurement data for the signal for determining location;
    receive a plurality of probe response frames, the plurality of probe response frames comprising a first probe response frame comprising a data representative of a first signal strength measurement as measured by a first respondent encrypted with a first key for the first respondent, and a second probe response frame comprising data representative of a second signal strength measurement as measured by a second respondent encrypted with a second key for the second respondent, wherein the first and second keys for the first and second respondents are derived from identification data that uniquely identifies the first and second respondents, respectively;
    aggregate the plurality of probe response frames; and
    forward the plurality of probe response frames to a server providing a location service;
    wherein the first probe response frame and the second probe response frame from the first and second respondents respectively remain encrypted with the respective first and second key for the first and second respondents when forwarded.

10. An apparatus, comprising:
    a communications interface;
    logic coupled to the communications interface configured to receive data from the communications interface;
    wherein the logic is configured to receive data from a wireless client comprising data representative of signal strength measurements from a plurality of wireless devices, wherein the data representative of signal strength measurements comprises a first signal strength measurement of a signal sent by the wireless client measured by a first wireless device signed by a first digital certificate for the first wireless device and a second signal strength measurement of the signal sent by the wireless client measured by a second wireless device signed by a second digital certificate associated with the second wireless device via the communications interface;
    wherein the logic is configured to acquire the first digital certificate for the first wireless device and the second digital certificate for the second wireless device;
    wherein the logic is configured to validate the first and second digital certificates; and
    wherein the logic is configured to determine a location of the wireless client based on measurements from validated wireless devices.

11. The apparatus of claim 10, wherein the first digital certificate comprises a first public key and private key pair which is based on a first root certificate and is unique to a first Media Access Control address associated with the first wireless device, and wherein the second digital certificate comprises a second public key and private key pair which is based on a second root certificate and is unique to a second Media Access Control address associated with the second wireless device.

12. The apparatus of claim 10, wherein the data representative of signal strength measurements from the plurality of wireless devices further comprises data representative of an unencrypted version of the first and second digital certificates.

13. The apparatus of claim 12, wherein the data representative of signal strength measurements further comprises a first Media Access Control address associated with the first wireless device, a second Media Access Control address associated with the wireless client, and a timestamp.

14. The apparatus of claim 10, wherein the data representative of signal strength measurements comprises a third signal strength measurement measured by a third wireless device signed by a third digital certificate associated with the third wireless device;
    wherein the logic is configured to acquire the third digital certificate;
    wherein the logic attempts to validate the third digital certificate; and
    wherein the logic is configured to discard the third signal strength measurement responsive to being unable to validate the third digital certificate.

* * * * *